Dec. 11, 1934.  D. W. HABER  1,984,186
PERMANENT MOLD
Filed Jan. 19, 1933  2 Sheets-Sheet 1

INVENTOR.
David W. Haber
BY
ATTORNEY.

Dec. 11, 1934.  D. W. HABER  1,984,186
PERMANENT MOLD
Filed Jan. 19, 1933  2 Sheets-Sheet 2
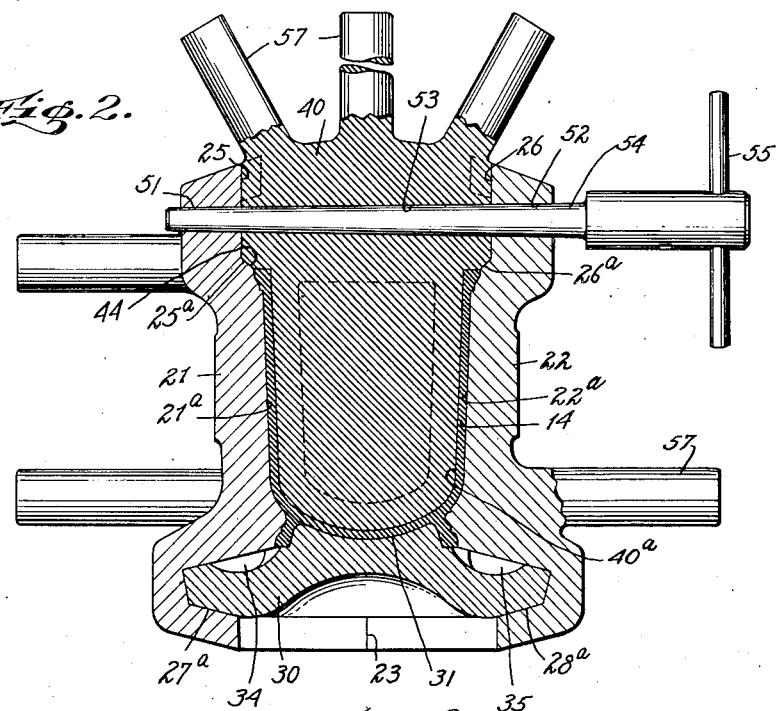
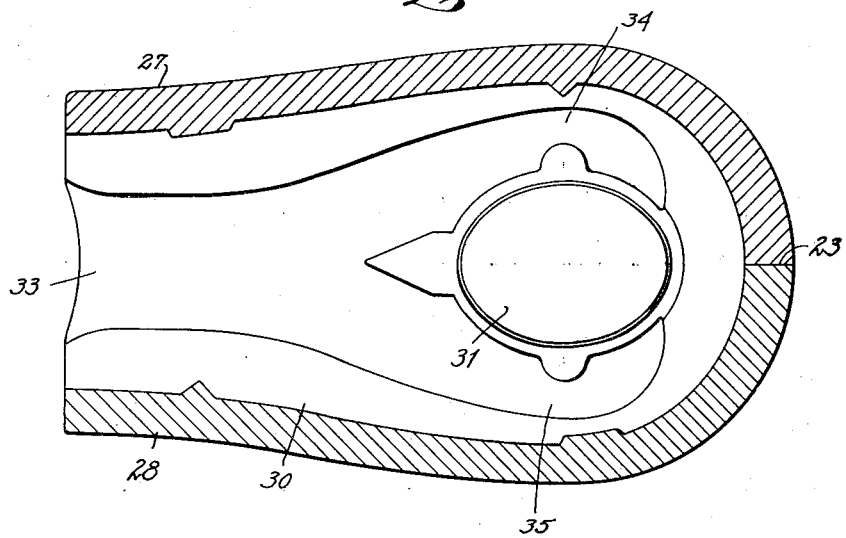
INVENTOR.
David W. Haber
BY
ATTORNEY.

Patented Dec. 11, 1934

1,984,186

UNITED STATES PATENT OFFICE 1,984,186

PERMANENT MOLD

David W. Haber, Bronx, N. Y.

Application January 19, 1933, Serial No. 652,470

3 Claims. (Cl. 22—153)

This invention relates to molded articles and means for molding the same. It is particularly directed to a utensil or receptacle having a body portion and a tubular spout extending therefrom and to a die for casting the same.

An object of this invention is to provide a highly practical and efficient die for molding the body and spout of a utensil in one piece.

A further object of this invention is to provide an improved utensil of the character described having a body and tubular spout portion thereof molded or cast of a single piece of metal thus eliminating the necessity for soldering the spout to the body, and otherwise cheapening and simplifying the manufacture thereof.

Another object of this invention is to provide a compact and simple die of the character described, which shall be comparatively inexpensive to manufacture, easy to manipulate for casting in one piece of metal a utensil having a body and a tubular spout, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which are shown one of the various possible illustrative embodiments of this invention, Fig. 1 is an elevational cross-sectional view of the die embodying the invention and showing the parts in position for a molding operation;

Fig. 2 is a cross-sectional view taken on line 2—2 of Fig. 1;

Fig. 3 is a cross-sectional view taken on line 3—3 of Fig. 1; and

Figure 1:
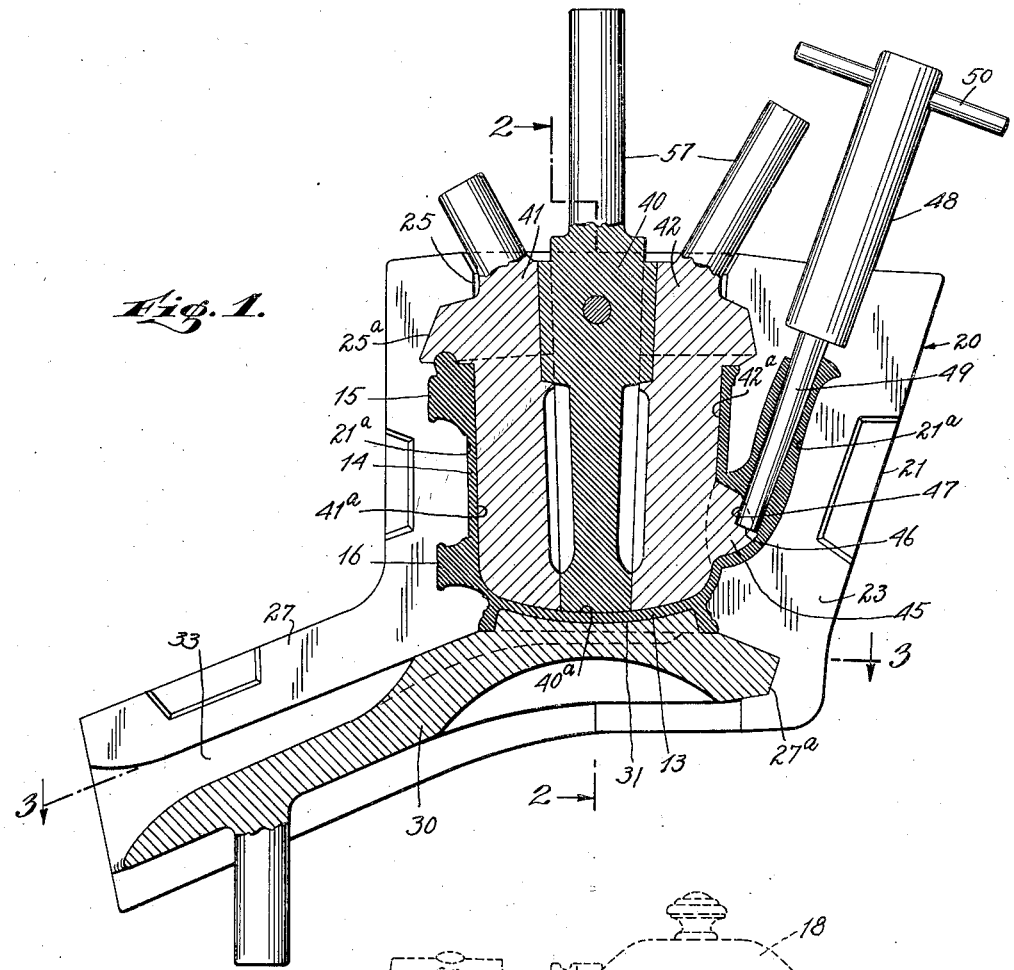
Figure 4:
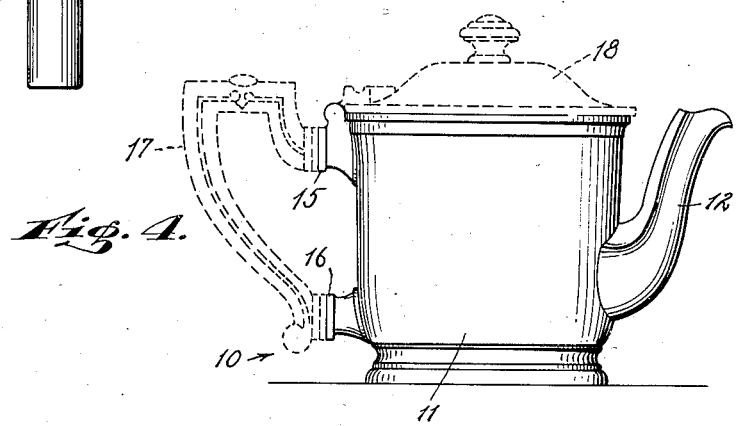
Fig. 4 is a side elevational view of a utensil embodying the invention, with the handle and cover thereof shown in dotted lines.

Referring now in detail to the drawings, 10 designates a utensil or receptacle for liquids, embodying the invention, here shown for the purpose of illustration only, in the form of a coffee pot and having a body portion 11 provided with an integral tubular upwardly and outwardly inclined and somewhat curved spout 12 and cast of a single piece of metal. The body 11 is formed with a bottom wall 13 and a side wall 14 from which extend rearwardly, top and bottom projections 15 and 16 to which the handle 17 may be attached and the cover 18 hinged. The body 11 is adapted to be cast or molded in the die 20 embodying the invention and illustrated in Figs. 1, 2 and 3 of the drawings.

Said die 20 comprises a pair of substantially similar, symmetrical, hollow, mating female parts or sections 21 and 22 having meeting surfaces 23 and provided with complementary internal surfaces 21a and 22a together forming the outer surfaces of said wall 14, spout 12 and projections 15 and 16. The recesses in the hollow mating sections 21 and 22 extend to the top of the die forming surfaces 25 and 26 extending upwardly from the surfaces 21a, 22a and having grooved portions 25a, 26a so that when said sections are placed together an opening is provided at the top for the purpose hereinafter explained. Said sections 21 and 22 are further provided at the bottom thereof, with extensions 27 and 28 having grooves or channels 27a and 28a for the purpose hereinafter appearing.

Inserted within said channels 27a, 28a is a die member 30 provided with a surface 31 forming the bottom surface of said bottom wall 13, and forming with the die members 21 and 22, a passage 33 branching into two passages 34 and 35 communicating with said surface 31.

Inserted within the hollow recess formed by the female die sections 21 and 22 are complementary male die members or sections 40, 41 and 42. The die member 40 is centrally disposed and provided with shoulders 44 contacting shoulders on the sections 21, 22 formed by the grooves 25a, 26a. Said section 40 is formed with an outer surface 40a spaced from surfaces 21a, 22a and forming a portion of the inner surface of the member 10. The die members 41 and 42 are disposed on opposite sides of the central die member 40 and are provided with shoulder portions received in channels or grooves 25a, 26a, and with surfaces 41a and 42a spaced from said surfaces 21a, 22a, forming the front and rear portions of the inner surface of the pot. The die members 40, 41 and 42 are constructed so that the central member 40 may be removed first to permit the side die members 41 and 42 to thereafter be moved toward one another and then removed.

The member 42 is further provided with a generally tapering projection 45 adjacent the bottom thereof projecting a short distance into the base portion of the recess defining the spout to form an inner tapering surface for the bottom portion of the spout 12. The projection 45 is provided with a recess having a circular flat surface 46 substantially perpendicular to the axis of the spout and a substantially cylindrical surface 47 extending from said surface 46, for the purpose hereinafter stated.

The mating sections 21 and 22 are further provided with complementary surfaces for receiving a tool 48 having a tapering pin portion 49, the end of which is received within the recess in projection 45 and contacting said cylindrical surface 47 and circular surface 46. The tool 48 is substantially coaxial with respect to the spout and the pin portion 49 is somewhat tapered and forms male die member for molding an opening within the spout 12, said opening communicating with the recess formed by the projection 45 of the die member 42. The member 48 is provided with a handle 50 to permit the same to be inserted and removed. The sections 21 and 22 and the central die member 40 are provided with registering openings 51, 52 and 53, respectively, to receive an elongated tapering wedge pin 54 having a handle 55. The pin 54 serves to frictionally retain the die members in assembled position. Each of the sections of the die may further be provided with projections 57 to facilitate handling thereof.

It will now be understood that the die is assembled by first placing together the die members or sections 21 and 22, then inserting the die members 41 and 42, and then inserting the central member 40 which is preferably somewhat wedge-shaped to press the die members 41 and 42 into position. The tool or member 48 is then inserted so that the outer end thereof contacts the projection 45. The die member 30 is then placed in position and the pin 54 inserted in the registering openings 51, 52, 53 to hold the die portions or sections in assembled position. The metal may then be poured through the passage 33 for the casting operation. After the body 10 is cast the tools 48 and 54 may be removed. Thereafter the central die member 40 may be lifted out of position. The die members 41 and 42 may thereafter be removed as also the die member 30.

A dominant feature of the invention is the provision of a pot or utensil having an upwardly and outwardly curved tubular spout for pouring coffee or other liquids and having the body portion and spout portion thereof molded of one piece of metal, and the further provision of an improved die for casting or molding the same. The provision of the projection 45 on the die member 42, and the member 48 having a tapering pin 49 contacting said projection 45, permits the molding of the spout with the opening therethrough integrally with the body 11.

Obviously, the outer end of the spout may be filed and finished to any suitable shape. Any suitable handle 17 may be attached to the projections 15 and 16 and the cover 18 may be pivotally attached to the projection 15 in the usual manner.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings, is to be interpreted as illustrative and not in a limiting sense.

Having thus described my invention, I claim as new and desire to secure by Letters Patent:

1. A die for molding a receptacle for liquids, having a body portion and an integral tubular spout, comprising a pair of mating female die sections having complementary recesses formed with inner surfaces conforming to the outer surfaces of said body portion and spout portion, a central male die section and a pair of male die sections disposed on opposite sides of said central male die section, said male sections being received within the recess formed by said female sections, one of said male sections having a projection extending into that portion of the complementary recesses of said female sections which forms the outer surface of the spout, and a member received between said female sections having a pin portion disposed substantially axially of said portion of said complementary recesses, the end of said spout contacting said projection for molding the opening within said spout.

2. A die for molding a receptacle for liquids, having a body portion and an integral tubular spout, comprising a pair of mating female die sections having complementary recesses formed with inner surfaces conforming to the outer surfaces of said body portion and spout portion, a central male die section and a pair of male die sections disposed on opposite sides of said central male die section, said male sections being received within the recess formed by said female sections, one of said male sections having a projection extending into that portion of the complementary recesses of said female sections which forms the outer surface of the spout, and a member received between said female sections having a pin portion disposed substantially axially of said portion of said complementary recesses, the end of said pin contacting said projection for molding the opening within said spout, said pin portion being tapered to facilitate removal thereof after a molding operation.

3. A die for molding a receptacle for liquids, having a body portion and an integral tubular spout, comprising a pair of mating female die sections having complementary recesses formed with inner surfaces conforming to the outer surfaces of said body portion and spout portion, a central male die section and a pair of male die sections disposed on opposite sides of said central male die section, said male sections being received within the recess formed by said female sections, one of said male sections having a projection extending into that portion of the complementary recesses of said female sections which form the outer surface of the spout, and a member received between said female sections having a pin portion disposed substantially axially of said portion of said complementary recesses, the end of said spout contacting said projection for molding the opening within said spout, said female die sections being formed with grooves on the inner surfaces thereof and a die section received between said female die sections and having portions extending into said grooves and provided with a surface forming the undersurface of said receptacle.

DAVID W. HABER.